Patented Mar. 5, 1940

2,192,461

UNITED STATES PATENT OFFICE 2,192,461

PRODUCTION OF CONCENTRATED SULPHUR DIOXIDE

Conway Baron von Girsewald, Gerhard Roesner, and Max Wohlwill, Frankfort-on-the-Main, Germany, assignors to American Lurgi Corporation, New York, N. Y., a corporation of New York No Drawing. Application March 11, 1938, Serial No. 195,416. In Germany May 22, 1937

1 Claim. (Cl. 23—178)

This invention relates to the recovery of concentrated sulphur dioxide by washing gases containing same with organic bases and expelling the absorbed sulphur dioxide by heating.

The invention relates more particularly to the recovery of the quantities of the organic bases, which are carried away by the effluent gases of the aforesaid absorption process in the form of vapour.

In the absorption of sulphur dioxide from gases—such as roasting-furnace gases—containing same, by means of organic bases, for example, aromatic amines—such as aniline, toluidine, or xylidine—and preferably by the use of mixtures of said bases with water—for example, as described in United States Patent No. 1,893,385, or United States Patent No. 2,122,544, certain amounts of the organic bases employed for the absorption are carried off, as vapour, by the waste gases from the absorption process. Although, in general—depending on their boiling points—the amount of these organic bases lost from the absorption process is very small, the resulting loss always sensibly affects the economy of the absorption process and makes it desirable for the bases contained in the waste gases to be recovered in some way or other.

Up to the present, this has chiefly been effected by washing the waste gases with dilute acids. In such case it was necessary to liberate the base from the resulting solution of its salt with the acid concerned, by adding a stronger base, for example, sodium carbonate, whereupon it could be returned to the absorption process.

In so doing, however, it is generally necessary to discard the residual solution containing the washing acid in the form of (for example) its sodium salt, owing to the lack of opportunity for its profitable utilisation, both the acid and the added alkali present in the solution being thus wasted. In particular, in the case of the treatment of gases with a very low content of $SO_2$ and at absorption temperatures above 30° C.—for example, in employing aniline or toluidine as the absorbent medium—the amounts of the bases contained in the waste gases, and consequently the amount of acid and alkali needed for their recovery from the acid washing liquor, is so considerable, that the aforesaid loss of acid and alkali, and also (on occasion) that of the base remaining in the liquor, is so heavy as also to have an unfavourable influence on the economy of the absorption process.

The present invention aims at obviating the foregoing drawbacks in the known process for the after treatment of the waste gases in question, and to this end in accordance therewith the bases, present as vapour in the waste gases, are extracted by washing the latter with an organic liquid of low vapour pressure, in which the base concerned is soluble, and by treating the resulting solution of the base in the said organic liquid with sulphur dioxide, in presence of water, the base being thus converted into its sulphite which then passes in solution in the water present.

Typical suitable treating liquids comprise high-boiling (preferably refined) mineral oils, for example, those boiling above about 200° C. For example, a partially refined paraffin oil, boiling between 235° and 240° C., has been found admirably suitable.

In general, the viscosity of the organic liquid present should not exceed about 2° Engler at 50° C., since emulsions of water with more viscous oils are resolvable only with some difficulty.

In general, the waste gases—subjected to treatment in accordance with the invention—from the reaction with the aqueous absorption mixture, are already so laden with water vapour that, in washing the same with an organic absorbent medium according to the invention, the gases deposit an amount of water which is sufficient to dissolve the sulphite formed by the subsequent action of sulphur dioxide on the solution of the base contained in the gases. If, however, the amount of water furnished by the gases should be insufficient for that purpose, or the gases should not contain any water at all, the amount needed to make up that required for dissolving the whole of the sulphite of the base must be added to the organic solvent before and/or during the action of the sulphur dioxide.

By proceeding in this manner there is finally obtained a mixture of an aqueous solution of the sulphite of the organic base previously dissolved in the organic liquid, and of the organic liquid freed from said base, which mixture can be easily separated into its two phases after being left to stand for a sufficient time.

The organic solvent can then be employed for absorbing fresh quantities of the base from the waste gas of the $SO_2$ absorption process. The solution of the sulphite of the organic base, and therefore the latter, can be also returned to the said absorption process by adding it to the absorbent medium, composed, for example, of a mixture of the base in question with water. Alternatively, the sulphur dioxide can be expelled from the said solution by heat, the residual base being returned, as absorbent medium, to the absorption process, and the residual water, separated from the base, employed again in treating the base-laden organic solvent with sulphur dioxide. Provided the amount of water thereby added to the absorption mixture is not increased to an undesirable extent, the former procedure is generally preferable.

Both the treatment of the waste gases from the $SO_2$ absorption process with an organic solvent for the organic base contained, in the form of vapour, in the said waste gases, and also the treatment of the resulting solution of the base in the organic solvent with sulphur dioxide in the presence of water, are preferably effected by exposing a large surface of the liquid, or liquids, in counter-flow to the gaseous reaction components. For this purpose, it is preferable to employ washing towers of known type, which are traversed in the upward direction by the gases, whilst the liquid, or liquid mixture, is passed downwards in such a manner as to expose the largest possible superficial area. This is obtained, in known manner, by allowing the liquid to fall, for example, in the form of rain, in the case of towers which are not provided with fillers, or to trickle down over the fillers or distributors in the case of packed towers. Towers with perforated or bell-shaped baffles, such as those employed in column stills, or mechanical washers, such as "Ströder" washers, (discs rotating partly immersed in the liquid, in a chamber traversed by the gases) may also be used for the same purpose.

The sulphur dioxide employed for extracting the absorbed bases from the organic solvent is preferably in the highest possible state of concentration, such as is obtained in heating the $SO_2$-laden mixture of organic base and water in the absorption process for recovering the sulphur dioxide from gases containing same.

The solution of the organic base in the organic solvent, which is to be subjected to the treatment with sulphur dioxide is preferably emulsified, prior to admission into the washing tower, by stirring it with the water which is to be simultaneously introduced into the tower.

*Example I*

The waste gas—still containing 0.2% by volume of $SO_2$ and 15% by volume of oxygen (remainder nitrogen)—from a plant for the absorption of sulphur dioxide from a roasting-furnace gas by treatment with a mixture of technical crude toluidine, or technical crude xylidine, and water, was passed upwards through a washing tower at the rate of 1 cubic metre per minute, said tower being traversed, in the downward direction and over bell-shaped baffles, by a stream of partially refined paraffin oil with a boiling point between 235 and 240° C., so that said oil passes away laden with toluidine or xylidine, at the bottom.

On entering the tower, the gas contained 3-4 grms. of toluidine, or 2-6.6 grms. of xylidine, per cubic metre. Owing to the condensation, in the tower, of water from the gas charged with water vapour during the treatment with the mixture for absorbing $SO_2$, a portion of the base, in passing through the tower, was not taken up by the paraffin oil, but by the water of condensation in which it was dissolved, to the extent of about 70-80%, as sulphite (as the result of the residual content of $SO_2$ in the gas).

The following table shows the amount of base taken up by the oil, the amount of water deposited, the residual amount of base contained in the effluent gas from the tower, and the amount of oil needed for the adequate recovery of the base per cubic metre of the waste gas from the absorption process:

| Experiment | Base | Gas throughput | Oil circulated | Water | Mean content of base in— | | | Oil consumption |
|---|---|---|---|---|---|---|---|---|
| | | | | | Oil | Water | Effluent gas | |
| | | Cubic meters | Liters | Liters | Grams per liter | Grams per liter | Grams per cubic meter | Cc. per cubic meter of gas |
| 1 | Toluidine | 990 | 61.2 | 21.0 | 36 | 56.5 | 0.024 | 60 |
| 2 | Xylidine | 2100 | 136.5 | 37.7 | 27.5 | 23.6 | 0.013 | 60 |

The mixture of paraffin oil and water, laden with toluidine or xylidine in the foregoing manner, was then treated, in a similar washing tower, with sulphur dioxide, practically free from extraneous gas recovered from the column still of the absorption process. After the emulsion first formed had settled down together with the paraffin oil (which was now free from the base and could be used, once more, for the absorption of base from the waste gas of the $SO_2$-absorption process) the base taken up, in the first place, by the paraffin oil, was recovered in the form of a solution of its sulphite, which could also be utilised by returning it to the aforesaid absorption process.

Depending on the kind of base employed, different amounts of water are preferably taken for the sulphur dioxide treatment of the base-laden organic liquid. For absorbing toluidine from the waste gas of the absorption process, said liquid should preferably be in the proportion of 1 part by volume of water to every 4 and not less than 3 parts by volume of oil, and, in the case of xylidine, about 1 part by volume of water to 4 and not less than 2.5 parts by volume of oil.

*Example II*

Paraffin oil was employed, as in Example I, for washing waste gas from the absorption of sulphur dioxide by means of a mixture of toluidine and water, the oil thus becoming laden with 32 grms. of toluidine per litre. 117 litres of this oil, with a total toluidine content of 3.74 kg. were emulsified with 29 litres of an aqueous condensate obtained in washing the gas with the paraffin oil and containing 61 grms. of toluidine per litre, or 1.77 kg. in all. This emulsion was passed through a tower packed with fillers and traversed, from below, by sulphur dioxide of 100% strength. After the emulsion issuing from the tower had settled down, it furnished 115 litres of oil, containing only 1.04 grm. of toluidine per litre (or 0.12 kg. in all) and 34 litres of an aqueous solution containing 154 grms. of toluidine per litre, or 5.24 kg. in all.

Thus a total quantity of 5.36 kg. of toluidine was recovered, being 98% of the 5.5 kg. of toluidine introduced with the oil and the aqueous condensate.

We claim:

Process for the recovery of $SO_2$ from gases containing the same which comprises scrubbing the gases with a wash liquid comprising an organic base thereby absorbing the bulk of the $SO_2$ content of the gases, scrubbing the resulting gases partially freed of $SO_2$ and carrying some of said organic base with an organic liquid of low vapor pressure which is practically inert chemically with respect to the constituents of the gases and possesses a solvent power for the organic base, treating the resulting organic liquid containing absorbed organic base with $SO_2$ gas in the presence of water whereby there is formed a separable mixture of said organic liquid and an aqueous liquid containing the sulphite of the organic base, separating said organic liquid and said aqueous liquid, using said aqueous liquid in the treatment of a fresh supply of $SO_2$ containing gases and returning the recovered organic liquid to the scrubbing operation.

CONWAY BARON von GIRSEWALD.
GERHARD ROESNER.
MAX WOHLWILL.